(12) United States Patent
Gascoigne et al.

(10) Patent No.: US 6,440,481 B1
(45) Date of Patent: Aug. 27, 2002

(54) METHOD OF MAKING PASTA FILATA CHEESE

(75) Inventors: Troy Gascoigne, Richville; Brent Jewett, Glenco; Roger Ochsner, Perham, all of MN (US)

(73) Assignee: Bongards' Creameries, Inc., Bongards, MN (US)

( * ) Notice: Subject to any disclaimer, the term of this patent is extended or adjusted under 35 U.S.C. 154(b) by 0 days.

(21) Appl. No.: 09/519,824

(22) Filed: Mar. 6, 2000

(51) Int. Cl.$^7$ .......................... A23C 19/00; A23C 19/09
(52) U.S. Cl. .......................... 426/582; 426/36; 426/519
(58) Field of Search ................... 426/582, 519, 426/36

(56) References Cited

U.S. PATENT DOCUMENTS

| | | | |
|---|---|---|---|
| 3,961,077 A | * 6/1976 | Kielsmeier ................... 426/582 |
| 4,112,835 A | 9/1978 | Mongiello et al. ............. 99/455 |
| 4,226,888 A | 10/1980 | Siecker et al. ................. 426/36 |
| 4,248,897 A | * 2/1981 | Christensen et al. ......... 426/582 |
| 4,459,313 A | 7/1984 | Swanson et al. ............... 426/39 |
| 4,492,153 A | 1/1985 | Grabowski et al. ............ 99/460 |
| 4,552,774 A | * 11/1985 | Gronfor ....................... 426/582 |
| 4,885,183 A | * 12/1989 | Strandholm .................. 426/582 |
| 4,898,745 A | * 2/1990 | Zamzow ....................... 426/582 |
| 4,919,943 A | 4/1990 | Yee et al. ...................... 426/39 |
| 5,030,470 A | 7/1991 | Kielsmeier et al. ........... 426/582 |
| 5,104,675 A | 4/1992 | Callahan et al. ............. 426/582 |
| 5,200,216 A | 4/1993 | Barz et al. ..................... 426/36 |
| 5,215,778 A | * 6/1993 | Davison et al. .............. 426/582 |
| 5,234,700 A | 8/1993 | Barz et al. ..................... 426/42 |
| 5,240,724 A | * 8/1993 | Otto ............................. 426/231 |
| 5,350,595 A | * 9/1994 | Hockenberry ................ 426/582 |
| 5,380,543 A | 1/1995 | Barz et al. ................... 426/582 |
| 5,470,595 A | 11/1995 | Kopp et al. .................. 426/231 |
| 5,520,934 A | 5/1996 | Meilleur et al. ............... 426/36 |
| 5,567,464 A | 10/1996 | Barz et al. ................... 426/582 |
| 5,709,900 A | 1/1998 | Miller et al. ................. 426/582 |
| 5,750,177 A | * 5/1998 | Yee ............................. 426/582 |
| 5,766,657 A | * 6/1998 | Farkye et al. ................. 426/39 |
| 5,902,625 A | 5/1999 | Barz et al. ................... 426/582 |
| 5,906,854 A | 5/1999 | Scherping et al. ........... 426/519 |
| 5,925,398 A | * 7/1999 | Rizvi ........................... 426/582 |

OTHER PUBLICATIONS

Delta Communications, Inc., Membrane System Cleans Brine (Separation Technology In'cs Brine Purification System)(Applied Technology), Nov. 1, 1992, page references not available.

Jeffrey Leib of Denver Post Magazine, Denver's Big Cheese, Apr. 16, 1995, page references not available.

Delta Communications, Inc., No–brine Mozzarella Cheese, Mar. 1, 1995, vol. 96, No. 3, ISSN: 0888–0050, page references not available.

Jack Mans, Le Grand Fromage (Agropur's Industrial Cheese Plant in Granby, Quebec)(Dairy Foods Processor of the Year), Dec. 1, 1996, vol. 97, No. 13, ISSN: 0888–0050, page references not available.

Donald McMahon, Craig Oberg, Deconstructing Mozzarella, Jul. 1, 1999, vol. 64, Issue 7, ISSN: 0308–8197, page reference not available.

\* cited by examiner

*Primary Examiner*—Carolyn Paden
(74) *Attorney, Agent, or Firm*—Gray, Plant, Mooty, Mooty & Bennett, PA; Cecilia M. Jaisle

(57) ABSTRACT

A method of making a pasta filata cheese can use equipment and methods typically used in making processed cheese. The method produces a cheese having all of the characteristics of a traditional pasta filata cheese in improved yields and with reduced waste by-products. Pasta filata designates cheeses having a plastic pliable homogeneous stringy structure, and includes such well-know cheeses as mozzarella and provolone.

4 Claims, 5 Drawing Sheets

Inventive Mozzarella Flow

METHOD OF MAKING PASTA FILATA CHEESE

BRIEF DESCRIPTION OF THE INVENTION

This invention is a method of making a pasta filata cheese. Pasta filata refers to a type of cheese having a plastic pliable homogeneous stringy structure and includes such cheeses as becchi, caciocavallo, mandarini, mozzarella, pizza cheese, provatura, provole, provolette, provolone, provolone giganti, salame and scamorze cheeses. This inventive method can use equipment and methods typically used in making processed cheese, and produces a cheese having all of the characteristics of a traditional pasta filata cheese in improved yields and with reduced waste by-products.

BACKGROUND OF THE INVENTION

Figure 1:
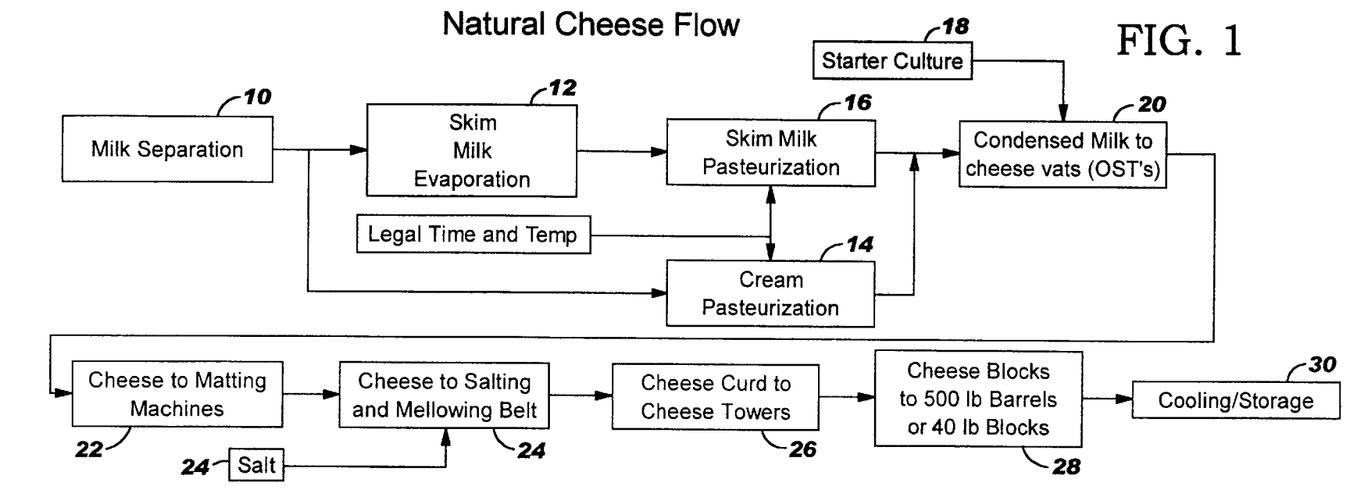
FIG. 1 is a schematic of a method of making a natural cheese curd.

Natural cheese is conventionally prepared from a milk product, such as whole milk 10, skim milk 12, nonfat dry milk, cream 14 or combinations thereof as illustrated in the FIG. 1 Natural Cheese Flow. The milk product is pasteurized 16, acidified, usually with lactic acid, and a bacterial culture 18 is added to the cheese vats 20. Adding a milk-coagulating enzyme coagulates the acidified milk. The coagulum, referred to as curd, is blended to a particulate and heated to separate whey from the curd. After separation of whey, as in matting machines 22, the curd is salted 24, conducted to the cheese towers 26 and formed into solid blocks of cheese 28. The cheese cures in temperature-controlled conditions 30 to achieve the desired texture and flavor.

Cheeses designated as pasta filata (plastic curd) are Italian-type cheeses. Broadly speaking, pasta filata cheeses are traditionally prepared by draining whey from the curd, immersing the curd in hot water or hot whey, and working, stretching and molding the cheese in its plastic condition. The molded cheese then traditionally chills in salt brine. Pasta filata cheese is produced initially in the same manner as conventional cheddar-type cheese. It can be manufactured from skim or whole milk, or mixtures thereof. The milk must be pasteurized. A starter organism, such as mixed heat resistant lactobacilli, can be added. After a ripening, addition of rennet diluted in water can set or coagulate the milk to a smooth thick curd.

After the coagulum reaches the consistency resembling cheddar cheese, it is comminuted, agitated and cooked. The curd may then be drained and cut into blocks. Whey is expelled and drained from the curd. When the curd reaches a predetermined acidity, it is blended in a cheese mill, stretched in hot water, molded, and immersed in brine to cool. Alternatively, the curd may soak in hot water for extraction of lactose before stretching and molding the curd and cooling in brine.

The preparation of curd in traditional mozzarella preparation typically uses thermophilic cultures and the present inventive method may use such cultures in preparing the curd. Since mozzarella manufacturing typically requires higher temperatures than, for example, cheddar manufacture, more heat tolerant thermophilic cultures are desirable. Typically, cheddar is exposed to its highest process temperature, between about 102–103° F., when cooked in the curd making process. Mozzarella manufactured according to traditional processes is exposed to higher process temperatures when cooked in the curd making process, and exposed to temperatures between about 140–160° F. in the cooking/stretching (molding) process.

Pasta filata cheeses may be hard (cured, aged or ripened for 2–12 months), such as provolone, or soft (fresh, moist), such as mozzarella. The present inventive method can prepare both hard and soft pasta filata cheeses. Preparation of natural pasta filata, such as mozzarella, has typically required that standardization of fat level be done to the milk, before forming the curd. Until the present invention, cooking and stretching the curd in hot water has been considered necessary to impart to the cheese its characteristic stringy appearance and the stretch typically associated with melted or baked pasta filata cheeses, such as mozzarella cheese. Perhaps the most popular and most familiar pasta filata cheese to U.S. consumers is mozzarella cheese. FDA standards classify mozzarella cheese into mozzarella, low moisture mozzarella, part skim mozzarella, and low moisture part skim mozzarella. The method of this invention may prepare any of these classifications of cheeses.

Traditional types of processed cheese are generally manufactured by grinding and blending the natural cheese with any needed dry ingredients (such as dry cream, etc.). The ground and blended product is introduced to a processed cheese cooker, and any other ingredients needed (such as anhydrous milk fat, emulsifier, water, salt, etc.) are added. The processed cheese is then pumped (such as by positive displacement) to packaging equipment. The resultant product is a soft-bodied easily meltable processed cheese.

The inventive method differs from traditional methods of making pasta filata in that much of the standardization of the fat-level takes place in the curd blenders. The inventive method uses either fresh or aged curd. The inventive method may add emulsifiers and other traditional cheese-making ingredients, if desired. An advantage of the inventive method that either minimal or no emulsifier need be added to the processed cheese cooker and that no other ingredients need be added to the processed cheese cooker. The inventive method uses direct steam for cooking and stretching, instead of hot water. It is an advantage of the present process to use a typical processed blender and a typical processed cheese cooker to prepare the pasta filata cheese. However, the method of this invention may use any other method of blending the curd and melting the curd using direct steam. The present invention blends and melts the curd just until forming an evenly melted product with none of the typical pasta filata individual strands. The present method molds the cheese by pumping or extruding the melted curd from the processed cheese cooker and filling various size packages. The filled packages cool in a blast cooler with sufficient air circulation. Salt can be added to the cheese either in the blender or in the processed cheese cooker, instead of using the traditional brine cooling and salting method. The inventive process may also use traditional molding and brining of the cheese, if desired, but eliminating brine cooling achieves distinct cost savings, as will be more fully explained further herein.

SUMMARY OF THE INVENTION

A method of making a pasta filata cheese according to the present invention comprises blending a typical pasta filata-type cheese curd, processing the blended curd in a processed cheese cooker just until the blended curd forms a uniformly melted product, and packaging and cooling the melted product from the processed cheese cooker. The method is preferably brine-free and the melted product is blast cooled in place of traditional brine cooling. The processed cheese cooker melts the blended curd by injecting steam into the blended curd just until the blended curd forms a uniformly melted product. The curd used in the inventive method may be a fresh curd, an aged curd, barrel cheese, and mixtures thereof.

A method of making a pasta filata cheese comprises blending a typical pasta filata-type cheese curd, injecting steam into the blended curd just until the blended curd forms a uniformly melted product, and packaging and cooling the melted product. Lowering the fat content of milk used in making the curd may reduce the fat content of the pasta filata cheese. The salt level of the pasta filata cheese may be determined by adjusting the salt content of the curd before injecting steam into the blended curd. To optimize quality of the pasta filata cheese, various ingredients may be added before injecting steam into the blended curd. These ingredients may be non-fat dry milk, anhydrous milk fat, milk protein concentrate, concentrated milk fat, dry cream, emulsifier, water, salt, or other ingredients allowed by current or future standards, and mixtures thereof.

A novel method of making a cheese comprises blending a curd having a moisture content of from about 38% to about 48%, a salt content of from about 0.8% to about 2%, a fat content (dry basis) of from about 38% to about 48% and a pH of from about 5.0 to about 5.4, injecting steam into the blended curd just until the blended curd forms a uniformly melted product, and packaging and cooling the melted product. A thermophilic culture may be added to the milk used in making the curd. Injecting steam into the blended curd produces internal cheese temperatures ranging from about 140° to about 180° F. Injecting steam into the blended curd is accompanied by a minimum auger speed to assure even mixing and melting of the blended curd without lowering fat and moisture content to below that desired for the cheese.

A novel method of making a cheese comprises blending a curd having a moisture content of from about 38% to about 48%, a salt content of from about 0.8% to about 2%, a fat content (dry basis) of from about 38% to about 48% and a pH of from about 5.0 to about 5.4, processing the blended curd in a processed cheese cooker just until the blended curd forms a uniformly melted product, and packaging and cooling the melted product from the processed cheese cooker. Augers in the processed cheese cooker preferably have a closed auger flighting. The curd preferably has a moisture content of from about 43% to about 45%, a salt content of from about 1.2% to about 1.5%, a fat content (dry basis) of from about 38% to about 42%, and a pH of from about 5.1 to about 5.3.

DETAILED DESCRIPTION OF THE INVENTION

One of the objectives of this invention is to provide a method of making a pasta filata cheese, such as mozzarella, by processing a traditional curd using processed cheese equipment and methods. The inventive method produces any of the traditional cheeses broadly described as pasta filata cheeses. This disclosure describes the method of this invention with reference specifically to the preparation of mozzarella cheese. However, the inventive method may produce any other pasta filata cheese. It may be necessary to make appropriate adjustments to the moisture, salt, fat and pH of the natural curd and/or to the melt in the processed cheese cooker, as will be better understood with reference to the following discussion. It may also be necessary to make appropriate adjustments to the curing of the cheese in order to prepare a hard, aged or cured pasta filata, such as provolone. The cheeses made by the inventive method replicate the flavor, functionality and appearance of traditional cheeses of these types. The ability to achieve a cheese with the characteristics of these traditional cheeses using processed cheese-making equipment provides distinct economic advantages over producing traditional mozzarella in the conventional manner. The inventive method obtains better solids recovery and increased product yield (in the range of about 0.5% by weight to about 2% by weight), as compared to traditional methods of making pasta filata. Throughout this description, all percentages are by weight, unless otherwise specified.

Generally, the method of this invention may use any curd typically used in the preparation of a pasta filata cheese. A traditional low-moisture part-skim pasta filata cheese, such as a traditional low-moisture part-skim mozzarella, typically has a target moisture content between about 47% to about 52%, a fat content (on a dry basis) between about 38% to about 42%, a pH about 5.1 to about 5.4, and a salt content between about 1.4% to about 1.9%. A traditional whole milk pasta filata cheese, such as a traditional whole milk mozzarella cheese, has a target moisture content between about 45% to about 48%, a fat content (on a dry basis) between about 45% to about 48%, a pH about 5.1 to about 5.4, and a salt content between about 1.4% to about 1.9%. If the curd used in the present inventive method for making a low-moisture part-skim mozzarella or a traditional whole milk pasta filata cheese does not have the parameters to produce a cheese within these ranges, various ingredients, well known to the cheese making art, may be added to adjust the curd to within the desired levels.

The inventive method prepares mozzarella and other pasta filata cheeses that retain the characteristics of traditional low-moisture part-skim and traditional whole milk mozzarella cheese and of other pasta filata cheeses. The cheeses made by this method include soft (fresh) cheeses, such as mozzarella, and hard (aged) cheeses, such as provolone.

The present inventive process may use either a fresh curd or a curd that has aged or cured for up to about two weeks. It is advantageous to use fresh curd, because fresh curd eliminates the step of packaging the intermediate cheese product, before introducing the cheese into the processed cheese cooker. Then, only a single packaging step of the final processed mozzarella is necessary. However, a disadvantage of using fresh curd is that some slight watering-off of the product occurs. "Watering off" describes the appearance of expelling from the cheese a fluid containing water and fat. "Watering-off" is a negative characteristic, because it prevents the cheese from achieving the desired proper moisture and fat content in the finished product. It also represents a yield loss. In addition, fresh curd may be difficult to grind. Curd that has cured for at least a few days has had time to knit together. Cured curd then grinds in the same manner as a cheddar curd. A mixture of fresh and aged or cured curd may also be used with satisfactory results. As shown in the Inventive Mozzarella Flow of FIG. 2, the inventive method may also suitably use barrel cheese 32. Barrel cheese 32 is cheese curd placed into vacuum-sealed packages (typically about 500 lbs.) and allowed to knit together to form a solid piece as it cools.

Some fat may be removed from the liquid milk before making the curd to lower the fat content. Fat may also be removed, or the fat content lowered, by adding non-fat milk solids to the curd during cheese manufacture. However, it may be less expensive to lower the fat content by adding non-fat milk solids, than by removing fat from the milk. Acceptable curd for purposes of this inventive method has a fat content of about 38% to 48% (dry basis), a moisture content of about 38% to about 48% and a salt level of about 0.8% to about 2.0% when entering the processed cheese cooker. The inventive method has obtained suitable results with a curd that has a fat content of about 42% (dry basis), a moisture content of about 43% to about 44% and a salt level of about 1.6% to about 1.8% when entering the processed cheese cooker.

Figure 2:
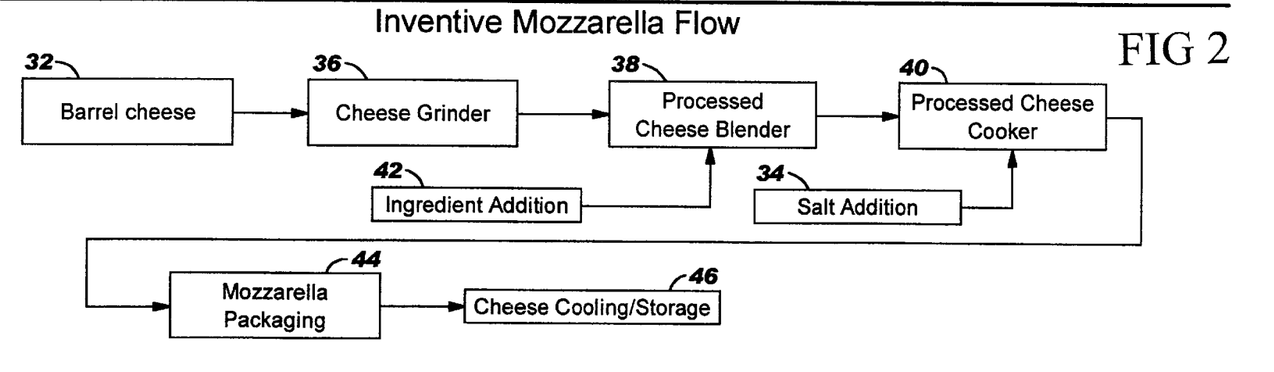
FIG. 2 is a schematic of the inventive method of making mozzarella, a pasta filata cheese, using processed cheese equipment and processed cheese methods.

The desired salt content of the pasta filata cheese, such as mozzarella, made by the method described herein preferably should equal the salt content of natural pasta filata cheese. This is necessary in order for the final cheese to obtain characteristics of taste, body and shelf life equivalent to those of a traditional pasta filata cheese. Salt 34 may be added at various stages of the inventive method, such as to the processed cheese cooker, as seen in FIG. 2. Generally, if the curd entering the cheese grinder 36 in FIG. 2, has a salt level to obtain a final cheese within this salt range, salt need not be added to the curd in the processed cheese blender 38 or the processed cheese cooker 40.

Various ingredients 42, known to the cheese-making art, may be added to achieve the optimum characteristics in the final cheese. These ingredients 42 may be added to the processed cheese blender 38. Non-limiting examples of such ingredients 42 are non-fat dry milk, anhydrous milk fat, milk protein concentrate, concentrated milk fat, emulsifier, salt, water, and other ingredients as allowed by current or future standards, and mixtures thereof. For example, addition of non-fat dry milk solids lowers the fat content of the cheese, based on the desired specifications of the finished cheese. Adding non-fat dry milk solids is an easier way to standardize the fat content of the cheese and to capture more of the nonfat solids. The cheese curd takes up re-hydrated nonfat dry milk more easily and the final cheese avoids watering-off. The fat and water content of the incoming cheese and of the desired final cheese determine the amounts of such ingredients 42 to be added. Often, these ingredients 42 may be functionally interchangeable, and the particular added ingredient 42 may vary according to the desired characteristics of the cheese product and according to the market availability and cost of these ingredients 42.

If desired, a suitable emulsifier may be added to the curd before it is direct steam melted in the processed cooker. Non-limiting examples of suitable emulsifiers include sodium citrate and sodium phosphate, in amounts of between less that about 0.5% to about 3% (the maximum amount allowed by law). If the curd has the correct fat and moisture content when introduced into the processed cheese cooker, an emulsifier is generally unnecessary. Our experience has indicated that addition of sodium citrate in the stated amounts results in a product with undesirable soft, mushy body, lacking the fibrous texture identified with traditional mozzarella. However, if the moisture and/or fat levels of the curd in the processed cheese cooker must be adjusted, an emulsifier aids in uniform and complete absorption of the added water and fat content. In addition, an emulsifier avoids watering-off of the mozzarella, by allowing absorption of added water. When an emulsifier, such as sodium citrate, is added to the present inventive method, it is preferably added in a level under 0.5%. Traditional mozzarella preparation typically uses thermophilic cultures and such cultures may be used in the present inventive method.

The present method can eliminate the use of an extruder molder and brine system. The melted curd pumps directed into a mold form 44, as shown in FIG. 2. It is not necessary to cool the cheese in salt brine, because the melted curd already has the proper salt content equal to that of a traditional mozzarella. The molded cheese product cools in a blast cooler 46 with sufficient air circulation to a cheese temperature of 45° F. or less, the maximum shipping temperature allowed by law. Generally, the mozzarella cheese according to this invention cools sufficiently in about 40 hours or a few days. Eliminating the step of cooling the cheese in brine offers distinct cost savings and increases cheese yield. Milk by-products leach out of the cheese in the brining process, reducing cheese yield. Spent brine is considered a waste product, with little if any useful value, and requires expensive disposal in compliance with applicable laws. Also, in traditional methods of making pasta filata cheeses, salting by brine immersion is unsatisfactory. The salt may not fully penetrate from the brine into the cheese, producing an outer salted zone and an inner unsalted or low-salted zone. Because salt is a preservative, the outer zone will be preserved at the expense of the inner zone that will tend to deteriorate and result in shortened shelf life and off-flavoring of the cheese. Salting the curd or the melt according to the present invention results in a more uniformly salted cheese with a longer shelf life.

In the preparation of traditional pasta filata, such as mozzarella, the curd melts in a cooker using hot water. The inventive method uses direct steam to melt the curd. Processed cheese cookers use direct steam to melt the curd and the present method can preferably use processed cheese cookers to melt the curd. The use of direct steam to melt the curd has several advantages over traditional preparations of mozzarella cheese. Solids loss is avoided or minimized with the inventive method using direct steam. In the traditional mozzarella preparation, fats and other milk solids are lost in the water used to melt the curd. This loss can amount to from about 0.5% to about 2%. In traditional mozzarella preparation, the product from the cooker goes directly to an extruder (sometimes referred to as a molder), where the melted curd is augered into molds. The product cools in the mold so that it will retain the mold shape when the molded product is pushed out of the mold into salt brine. While the molded cheese product finishes cooling in the brine, salt from the brine soaks into the molded cheese product before packaging.

Mozzarella produced in the traditional process cooks in water that reaches temperatures of from about 145° to about 180° F. The cheese itself attains internal temperatures ranging from about 125° to about 140° F. The inventive method using direct steam melting produces cheese internal temperatures ranging from about 140° to about 180° F. Higher temperatures in the inventive process result in longer shelf life of the final cheese.

In the inventive method, the lowest possible auger speed assures even mixing and melting of the curd without lowering the fat and moisture content to below that desired for the final mozzarella cheese. In a traditional processed cheese manufacture, the augers in the processed cheese cooker typically run at about 100 RPM. It is preferred to slow the auger speed for the present inventive process to a range of about 30 to about 50 RPM. Higher speeds tended to mash the curd together and to squeeze out needed fat and moisture. The inventive method needs only the lowest auger speed to assure even mixing and melting of the curd without lowering the fat and moisture content to below that desired for the final mozzarella cheese.

Figure 5:
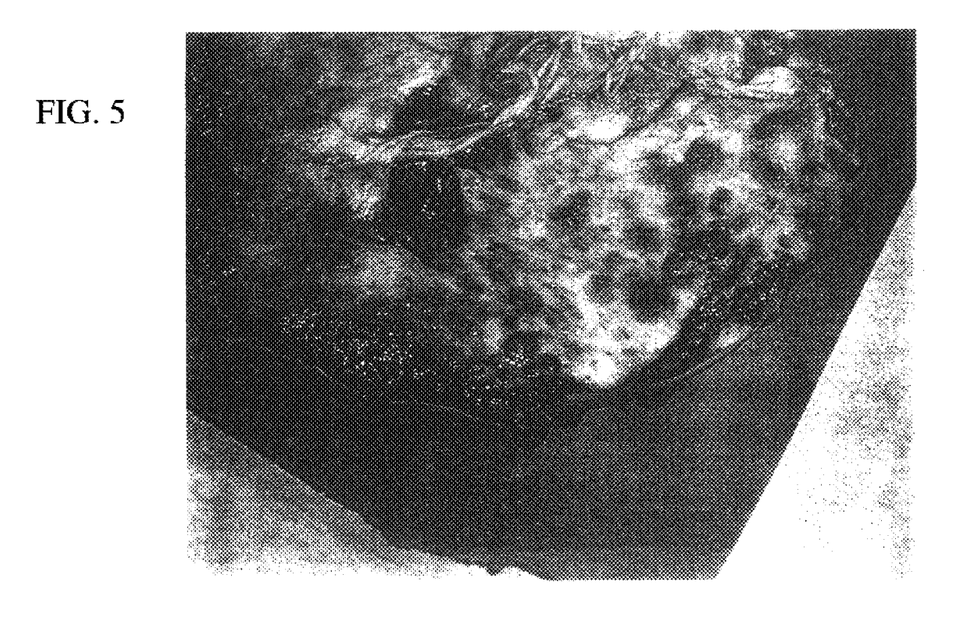
FIG. 5 illustrates the appearance of a mozzarella made according to the invention baked onto a pizza.
Figure 6:
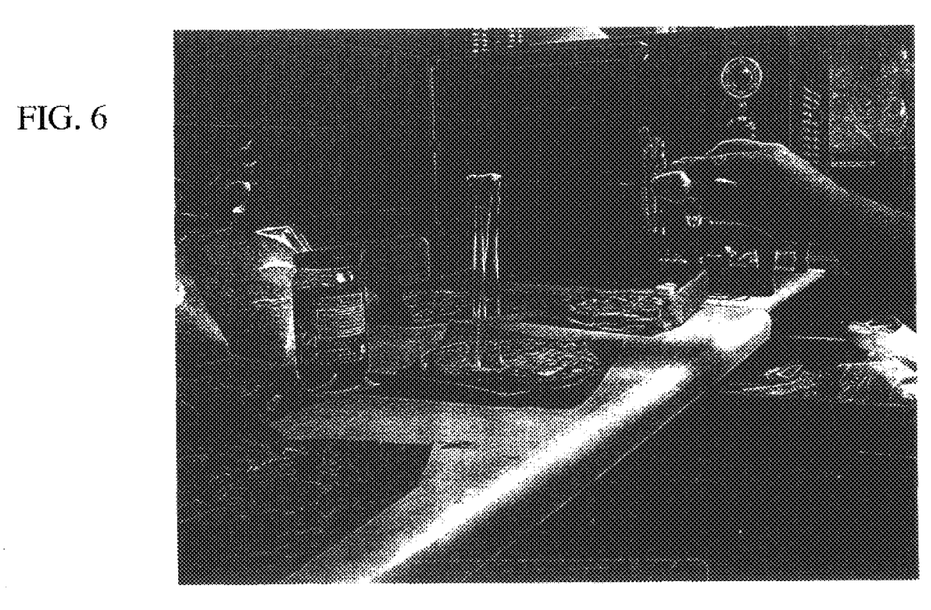
FIG. 6 illustrates the stretch of a mozzarella made according to the invention baked onto a pizza.

The mozzarella cheese prepared according to this invention has body, meltability, stretchability and flavor characteristics of a traditional mozzarella. The body of mozzarella refers to its appearance upon tearing apart the cooled cheese. The desired body or texture should approximate the stringiness seen in pulling apart cooked chicken breast. Meltability refers to the ability of shredded strands of mozzarella cheese to melt completely and flow together, so individual strands are no longer present. Stretchability refers to the measurement of the melted cheese fibers as they pull upward from the melted mass. FIG. 5 illustrates the consumer-acceptable appearance of a mozzarella made according to the inventive method baked onto a typical pizza. Most customers desire stretchability of from about 6 to about 24 inches, evidenced in mozzarella cheese made by the present process. FIG. 6 illustrates the consumer-acceptable stretch of a mozzarella made according to the inventive method baked onto a typical pizza.

To test the characteristics of the mozzarella prepared according to this invention, a pizza was made up using cheese made according to this invention, and the pizza cooked for four 1 minutes in a 450° F forced air oven. The pizza cooled at room temperature for about one minute before evaluation. The cheese browned well without burning. No free oil was observed from the cheese cooked on the pizza, and the cheese had acceptable stretch characteristics.

The mozzarella cheese made according to the inventive method can be packaged in any sizes common to the cheese industry and according to the customer's needs. Thus, sizes of 5 lbs., 10 lbs., 20 lbs. and 40 lbs., as well as other sizes, may be prepared. Following are examples of making a mozzarella according to the method of this invention

EXAMPLE ONE

Figure 3:
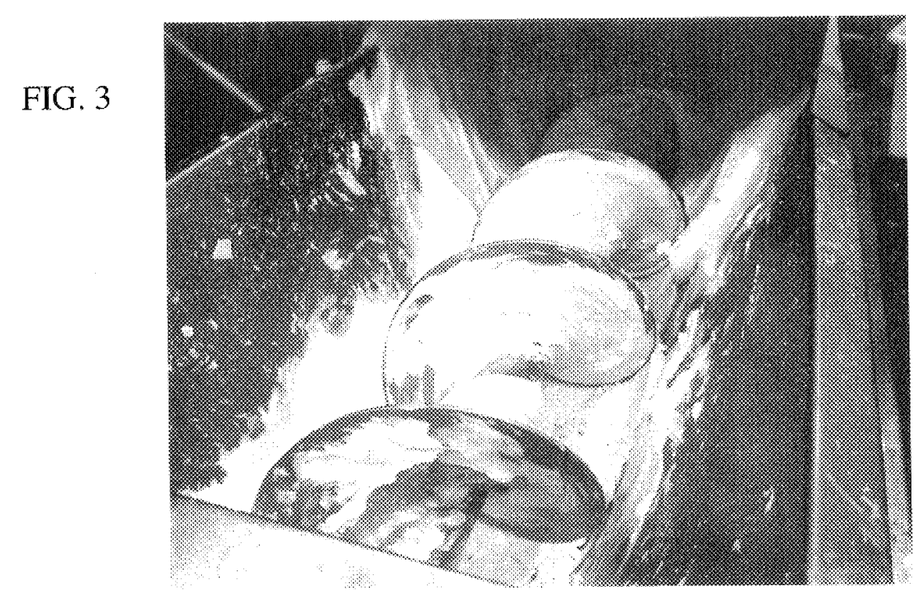
FIG. 3 is a photograph of a closed auger flighting, an auger style in which there is a solid fighting to the auger shaft.
Figure 4:
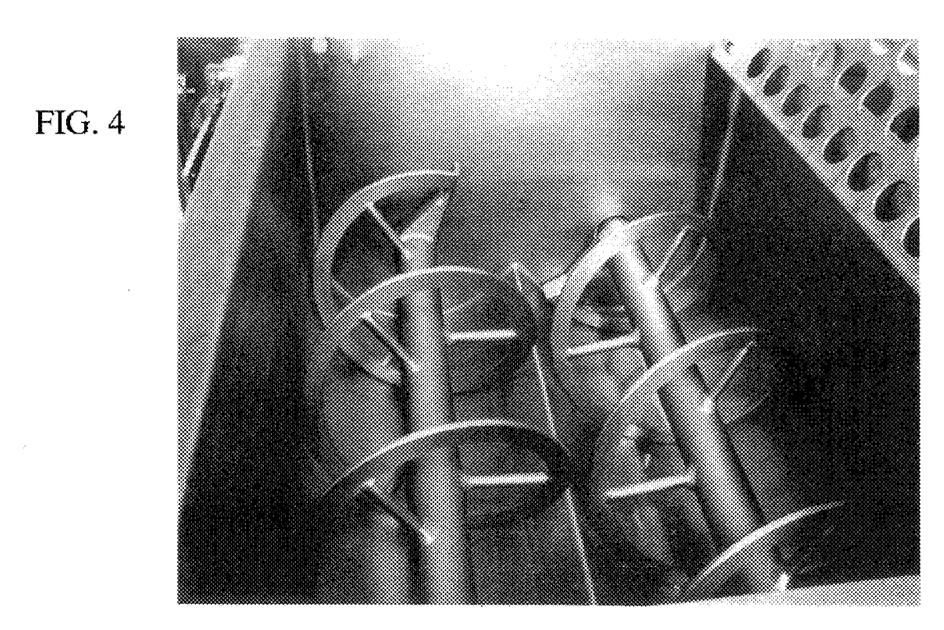
FIG. 4 shows an open auger flighting, an auger style in which there is a space between the flighting and the auger shaft.

Reduced fat fresh curd was prepared using thermophilic cultures and a washed curd method; both used traditionally in making curd for mozzarella cheese. The curd was approximately 38% moisture. Based upon prior processed American cheese runs, it was assumed that approximately 8% moisture would be gained from the direct steam method of melting the curd. The curd was processed on full-scale processed cheese loaf equipment, including grinding on a Reitz Grinder Model No. RE24-K9E943, Ser. No. RE750050, made by Bepex, and blending on an APV Crepaco Model 100DR, Ser. No. G-3435 or Serial No. G-3436. The processed curd was then cooked in a full-scale processed cheese cooker. The speed of the augers in the processed cheese cooker was approximately 50 RPM. A closed auger flighting was used, as seen in FIG. 3, that is, an auger style in which there is a solid flighting to the auger shaft. For comparison, FIG. 4 shows an open auger flighting, an auger style in which a space is between the flighting and the auger shaft. A closed auger flighting is preferred, because the product tends to ball up around the end of the shaft with an open auger flighting.

No sodium citrate or water was added, so that the final moisture content would be a little low compared to that of traditional mozzarella. The finished cheese had a moisture level of about 46%. The amount of steam added was the minimum amount necessary to melt the curd and heat the curd to about 160° F. Once the curd was uniformly melted, the processed cheese cooker was unloaded to avoid any over working of the cheese. If the cheese is over worked, the cheese begins to water-off in the cooker. Also, cheese that is over worked will have a poor evaluation. Overworked cheese will have poor stretch and exhibit oiling off. The cheese produced by this test had an exceptionally acceptable appearance. The following factors contributed to the effectiveness of the process of this run: minimal auger speed, no emulsifier (sodium citrate), and unloading of the curd from the processed cheese cooker immediately after the cheese was visually determined to be well and uniformly melted.

The product from the processed cheese cooker was packaged by pumping (positive displacement) from a balance tank from the cooker into plastic lined boxes. The packaged cheese cooled for a few days in a blast cooler with a sufficient amount of air movement. Body and meltability tests were conducted on the finished cheese. The cheese had desirable body, meltability, stretchability and flavor of a traditional mozzarella cheese. The cheese produced by this procedure is definitely customer-acceptable as a mozzarella cheese.

EXAMPLE TWO

The procedures described in Example One were followed, except that 20 lbs. of water was added to about 700 lbs. of curd in an effort to bring the final moisture content in line with the desired target range. The water is pumped in and metered by weight. Water was added before cooking in the processed cheese cooker. A CEM Labwave 900, Ser. No. L 1160, manufactured in North Carolina tested the moisture. This apparatus weighs a sample, microwaves the sample to dryness, and calculates the percent moisture in the original sample. This test indicated that the moisture content of the finished cheese would be still a little low, so more water was added to the batch to bring the moisture content of the final product within the desired range. The product from the processed cheese cooker was packaged by pumping (positive displacement) from a balance tank from the cooker into plastic lined boxes. The packaged cheese cooled for a few days in a blast cooler with a sufficient amount of air movement. Body and meltability tests were conducted on the finished cheese. The cheese had desirable body, meltability, stretchability and flavor. The product of this test is definitely customer-acceptable as a mozzarella cheese.

EXAMPLE THREE

Using the procedures and equipment described in Example One, 70 lbs. of water was added to about 700 lbs. curd. The water is pumped in, metered by weight, and added before cooking. Some watering off was observed. The product from the processed cheese cooker was packaged by pumping (positive displacement) from a balance tank from the cooker into plastic lined boxes. The packaged cheese cooled for a few days in a blast cooler with a sufficient amount of air movement. Body and meltability tests were conducted on the finished product. The product had desirable body, meltability, stretchability and flavor. The product of this test is definitely customer-acceptable. The product showed some signs of watering off and had some free fat on the surface of the cheese block. The cheese made by this Example could possibly be improved by raising the moisture in the fresh curd to minimize the amount that would have to be added to the processed cheese cooker.

The fresh curd for use in the method of this invention should generally have the following overall parameters.

Moisture: about 38% to about 48%.
Salt: about 0.8% to about 2%.
Fat FDB: about 38% to about 48%.
pH: about 5.0 to about 5.4.

Optimally, the fresh curd for use in the method of this invention should have the following parameters.

Moisture: about 43% to about 45%.
Salt: about 1.2% to about 1.5%.
Fat (dry basis): about 38% to about 42%.
pH about 5.1 to about 5.3

This disclosure predominately describes the preparation of mozzarella cheese. The inventive method can also produce other pasta filata cheeses with appropriate adjustments to the moisture, salt, fat and pH of the natural curd and/or to the product in the processed cheese cooker. Similarly, a hard (aged) pasta filata cheese, such as provolone, can be prepared by appropriate aging after the cheese has been packaged and cooled. Accordingly, this invention is generic in its scope and not limited to the specific examples given herein, and is commensurate with the scope of the appended claims.

That which is claimed is:

1. A method of making a pasta filata cheese comprising:
   blending a typical pasta filata-type cheese curd,
   injecting steam into the blended curd just until the blended curd forms a uniformly melted product, and
   packaging and cooling the melted product;
   wherein various ingredients are added before injecting steam into the blended curd to optimize quality of the pasta filata cheese, the ingredients selected from non-fat dry milk, anhydrous milk fat, milk protein concentrate, concentrated milk fat, dry cream, emulsifier, water, salt and mixtures thereof.

2. A method according to claim 1, wherein the fat content of the pasta filata cheese is reduced by lowering the fat content of milk used in making the card.

3. A method according to claim 1, wherein the salt level of the pasta filata cheese is determined by adjusting the sale content of the curd before injecting steam into the blended curd.

4. A method according to clam 1, that is brine-free and wherein the melted product is blast cooled.

* * * * *

US006440481C1

(12) INTER PARTES REEXAMINATION CERTIFICATE (0009th)

United States Patent
Gascoigne et al.

(10) Number: US 6,440,481 C1
(45) Certificate Issued: Jul. 17, 2007

(54) METHOD OF MAKING PASTA FILATA CHEESE

(75) Inventors: Troy Gascoigne, Richville, MN (US); Brent Jewett, Glenco, MN (US); Roger Ochsner, Perham, MN (US)

(73) Assignee: Bongards' Creameries, Inc., Bongards, MN (US)

Reexamination Request:
No. 95/000,013, May 15, 2003

Reexamination Certificate for:
| Patent No.: | 6,440,481 |
| Issued: | Aug. 27, 2002 |
| Appl. No.: | 09/519,824 |
| Filed: | Mar. 6, 2000 |

(51) Int. Cl.
*A23C 19/00* (2006.01)
*A23C 19/068* (2006.01)
*A23C 19/082* (2006.01)

(52) U.S. Cl. .............. 426/582; 426/36; 426/519
(58) Field of Classification Search ............ None
See application file for complete search history.

(56) References Cited

U.S. PATENT DOCUMENTS

| 3,117,008 A | 1/1964 | Mauk |
| 3,531,297 A | 9/1970 | Kielsmeier |
| 4,898,745 A | 2/1990 | Zamzow |
| 5,225,220 A | 7/1993 | Gamay .......... 426/39 |
| 5,902,625 A | 5/1999 | Barz |
| 5,925,398 A | 7/1999 | Rizvi .......... 426/582 |
| 6,319,526 B1 | 11/2001 | Dahlstrom ........ 426/36 |

OTHER PUBLICATIONS

T.P. Guinee, Dairy Prods. Res. Ctr., "Pizza Cheese Quality—Effects of Seasonal Variation in Milk Composition," End–of–Project Rpt. 1998, DPRC No. 6 (Feb. 1999).
C.J. Oberg et al., Journal of Dairy Sci., "Effects of Proteolytic Activity of Thermolactic Cultures on Physical Properties of Mozzarella Cheese," vol. 74, pp. 389–397 (1991).
F. Kosikowski, "Cheese and Fermented Milk Foods," 2$^{nd}$ Edition, 2$^{nd}$ Printing, published and distributed by F.V. Kosikowski and Assoc., Brooktondale, NY, pp. 179–188 and 196–203 (1978).
21 C.F.R. § 133.155[53 FR 3743, Feb. 9, 1998 as amended at 58 FR 2893, Jan. 6, 1993].

*Primary Examiner*—Jerry D. Johnson (57) ABSTRACT

A method of making a pasta filata cheese can use equipment and methods typically used in making processed cheese. The method produces a cheese having all of the characteristics of a traditional pasta filata cheese in improved yields and with reduced waste by-products. Pasta filata designates cheeses having a plastic pliable homogeneous stringy structure, and includes such well-know cheeses as mozzarella and provolone.

USchy6,440,481 C1

INTER PARTES
REEXAMINATION CERTIFICATE
ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4 are cancelled.

New claims 5–8 are added and determined to be patentable.

5. *A method of making a pasta filata cheese comprising:*
*preparing for blending a typical pasta filata-type cheese curd comprised of a barrel cheese curd,*
*blending the cheese curd,*
*injecting steam into the blended curd just until the blended curd forms a uniformly melted product, and*
*packaging and cooling the melted product;*
*wherein various ingredients are added before injecting steam into the blended curd to optimize quality of the pasta filata cheese, the ingredients selected from non-fat dry milk, anhydrous milk fat, milk protein concentrate, concentrated milk fat, dry cream, emulsifier, water, salt and mixtures thereof.*
6. *A method of making a pasta filata cheese comprising:*
*preparing for blending a typical pasta filata-type cheese curd comprised of a curd aged for up to about two weeks,*
*blending the cheese curd,*
*injecting steam into the blended curd just until the blended curd forms a uniformly melted product, and*
*packaging and cooling the melted product;*
*wherein various ingredients are added before injecting steam into the blended curd to optimize quality of the pasta filata cheese, the ingredients selected from non-fat dry milk, anhydrous milk fat, milk protein concentrate, concentrated milk fat, dry cream, emulsifier, water, salt and mixtures thereof.*
7. *A method of making a pasta filata cheese comprising:*
*preparing for blending a typical pasta filata-type cheese curd comprised of a mixture of a fresh cheese curd and a barrel cheese curd,*
*blending the cheese curd,*
*injecting steam into the blended curd just until the blended curd forms a uniformly melted product, and*
*packaging and cooling the melted product;*
*wherein various ingredients are added before injecting steam into the blended curd to optimize quality of the pasta filata cheese, the ingredients selected from non-fat dry milk, anhydrous milk fat, milk protein concentrate, concentrated milk fat, dry cream, emulsifier, water, salt and mixtures thereof.*
8. *A method of making a pasta filata cheese comprising:*
*preparing for blending a typical pasta filata-type cheese curd comprised of a mixture of a fresh cheese curd and a curd aged for up to about two weeks,*
*blending the cheese curd,*
*injecting steam into the blended curd just until the blended curd forms a uniformly melted product, and*
*packaging and cooling the melted product;*
*wherein various ingredients are added before injecting steam into the blended curd to optimize quality of the pasta filata cheese, the ingredients selected from non-fat dry milk, anhydrous milk fat, milk protein concentrate, concentrated milk fat, dry cream, emulsifier, water, salt and mixtures thereof.*

\* \* \* \* \*